US007471725B2

(12) United States Patent
Linzer et al.

(10) Patent No.: US 7,471,725 B2
(45) Date of Patent: Dec. 30, 2008

(54) SEGMENTED MOTION ESTIMATION WITH NO SEARCH FOR SMALL BLOCK SIZES

(75) Inventors: Elliot N. Linzer, Suffern, NY (US); Aaron G. Wells, Oakland, CA (US)

(73) Assignee: LSI Corporation, Milpitas, CA (US)

( * ) Notice: Subject to any disclaimer, the term of this patent is extended or adjusted under 35 U.S.C. 154(b) by 848 days.

(21) Appl. No.: 10/397,401

(22) Filed: Mar. 26, 2003

(65) Prior Publication Data

US 2004/0190616 A1 Sep. 30, 2004

(51) Int. Cl.
*H04B 1/66* (2006.01)
*H04N 7/12* (2006.01)
*H04N 11/02* (2006.01)
*H04N 11/04* (2006.01)

(52) U.S. Cl. ............................ 375/240.16; 375/240.24

(58) Field of Classification Search ............ 375/240.16; 348/402.1, 413.1, 416.1
See application file for complete search history.

(56) References Cited

U.S. PATENT DOCUMENTS 5,594,504 A * 1/1997 Ebrahimi ............... 375/240.16
5,748,247 A * 5/1998 Hu ........................ 375/240.14
2004/0028282 A1* 2/2004 Kato et al. .................. 382/236

OTHER PUBLICATIONS

International Standardization Working Document ITU-T SG16 VCEG-M81, "H.26L" Test Model Long Term No. 7 (TML-7), May 3, 2001 pp. 14 and 24-27.*
"Unified Coding Style for the H.26L Reference Software", Suhring, Karsten, Sep. 2002, Heinrich Hertz Institute, pp. 1-5.

* cited by examiner

*Primary Examiner*—Mehrdad Dastouri
*Assistant Examiner*—Jeremaiah C Huber
(74) *Attorney, Agent, or Firm*—Christopher P. Maiorana, PC

(57) ABSTRACT

An apparatus including a first circuit, a second circuit and a third circuit. The first circuit may be configured to generate a plurality of first motion vectors and first error scores in response to a search of a macroblock of an image. The search generally includes a range of motion vectors of the macroblock. The second circuit may be configured to generate a plurality of second motion vectors and second error scores for a plurality of sub-blocks of the macroblock in response to a set of discrete candidate motion vectors selected from the plurality of first motion vectors. The third circuit may be configured to segment the macroblock in response to (i) the plurality of first motion vectors and first error scores and (ii) the plurality of second motion vectors and second error scores.

25 Claims, 4 Drawing Sheets

300 302 304 306 308 310 312 314 316 318

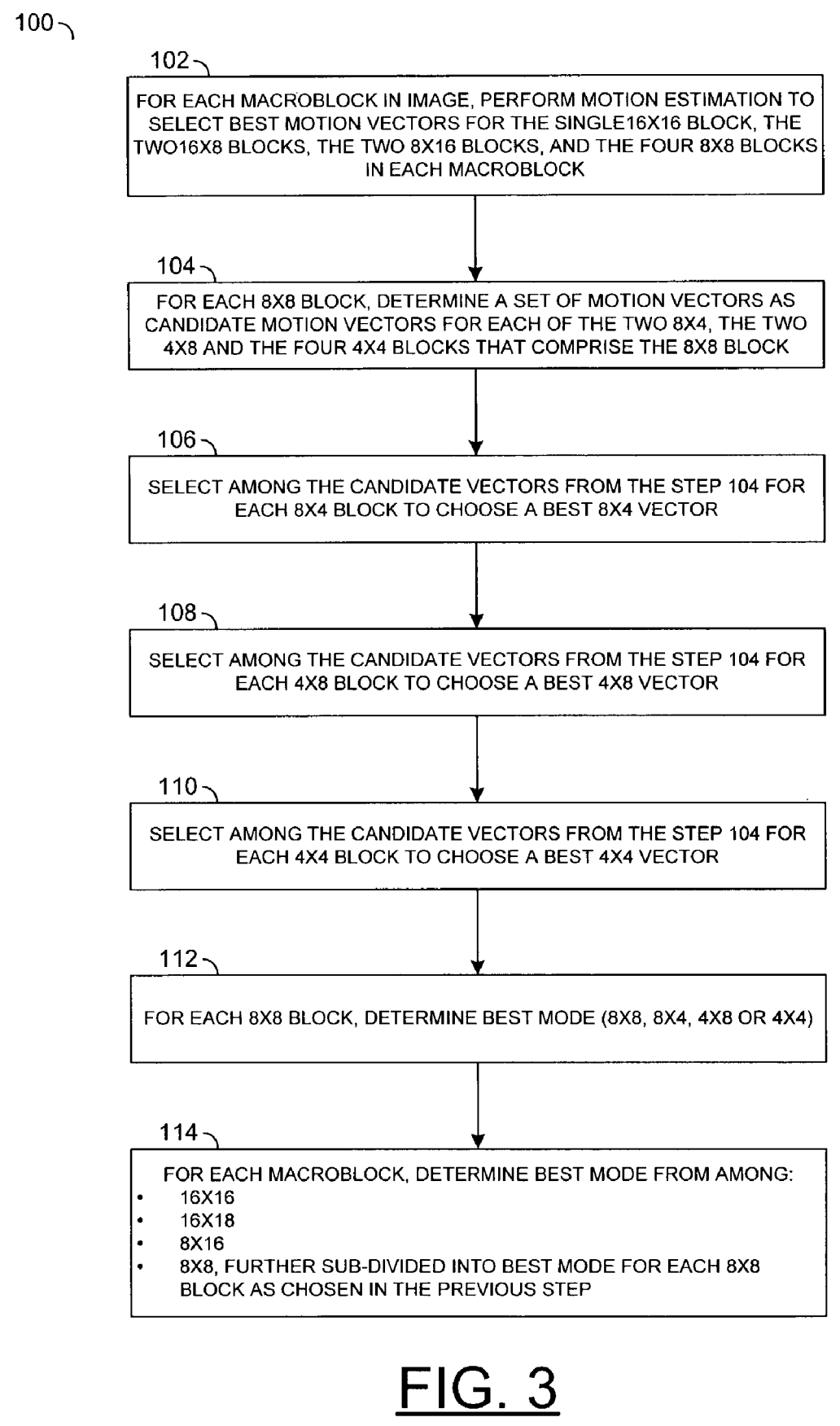

100

102

FOR EACH MACROBLOCK IN IMAGE, PERFORM MOTION ESTIMATION TO SELECT BEST MOTION VECTORS FOR THE SINGLE16X16 BLOCK, THE TWO16X8 BLOCKS, THE TWO 8X16 BLOCKS, AND THE FOUR 8X8 BLOCKS IN EACH MACROBLOCK

104

FOR EACH 8X8 BLOCK, DETERMINE A SET OF MOTION VECTORS AS CANDIDATE MOTION VECTORS FOR EACH OF THE TWO 8X4, THE TWO 4X8 AND THE FOUR 4X4 BLOCKS THAT COMPRISE THE 8X8 BLOCK

106

SELECT AMONG THE CANDIDATE VECTORS FROM THE STEP 104 FOR EACH 8X4 BLOCK TO CHOOSE A BEST 8X4 VECTOR

108

SELECT AMONG THE CANDIDATE VECTORS FROM THE STEP 104 FOR EACH 4X8 BLOCK TO CHOOSE A BEST 4X8 VECTOR

110

SELECT AMONG THE CANDIDATE VECTORS FROM THE STEP 104 FOR EACH 4X4 BLOCK TO CHOOSE A BEST 4X4 VECTOR

112

FOR EACH 8X8 BLOCK, DETERMINE BEST MODE (8X8, 8X4, 4X8 OR 4X4)

114

FOR EACH MACROBLOCK, DETERMINE BEST MODE FROM AMONG:
- 16X16
- 16X18
- 8X16
- 8X8, FURTHER SUB-DIVIDED INTO BEST MODE FOR EACH 8X8 BLOCK AS CHOSEN IN THE PREVIOUS STEP

FIG. 3

SEGMENTED MOTION ESTIMATION WITH NO SEARCH FOR SMALL BLOCK SIZES

FIELD OF THE INVENTION

The present invention relates to data compression generally and, more particularly, to a method and apparatus for segmented motion estimation with no search for small block sizes.

BACKGROUND OF THE INVENTION

Compression of digital video data is needed for many applications. Transmission over limited bandwidth channels such as direct broadcast satellite (DBS) and storage on optical media (i.e., CD, DVD, etc.) are typical examples. In order to achieve efficient compression, complex, computationally intensive processes are used for encoding (or compressing) and decoding (or decompressing) digital video signals. For example, even though MPEG-2 is known as a very efficient method for compressing video, more efficient compression standards such as H.264 (and MPEG-4) are being developed.

H.264 (and MPEG-4) allows for "segmented" motion compensation. A 16×16 macroblock can be motion compensated with one motion vector for the whole macroblock, a pair of motion vectors for the left and right sides (e.g., 8×16 blocks), a pair of motion vectors for the upper and lower halves (e.g., 16×8 blocks) or a motion vector for each 8×8 block. If a motion vector for each 8×8 block is used, then each 8×8 block can be coded with (i) one vector for the 8×8 block, (ii) a pair of motion vectors for the left and right sides (e.g., 4×8 blocks), (iii) a pair of motion vectors for the upper and lower halves (e.g., 8×4 blocks) or (iv) four motion vectors (e.g., one for each 4×4 block).

Conventional motion compensation either searches all block sizes or ignores some block sizes. Performing searches for each possible block size can be expensive. Searching all block sizes involves using expensive, high-speed hardware or a slow, non-real-time software encoder/decoder. When blocks are ignored, quality is sacrificed.

A challenge in conventional digital video data compression techniques involves efficient motion estimation (ME) searches for a compression technique that uses variable block sizes. Conventional solutions employ a full search and a separate hierarchical search for each mode. However, the conventional solutions are computationally intensive, slow, and need expensive hardware to run.

It would be desirable to provide segmented motion estimation with no search for small size blocks.

SUMMARY OF THE INVENTION

The present invention concerns an apparatus comprising a first circuit, a second circuit and a third circuit. The first circuit may be configured to generate a plurality of first motion vectors and first error scores in response to a search of a macroblock of an image. The search generally comprises a range of motion vectors of the macroblock. The second circuit may be configured to generate a plurality of second motion vectors and second error scores for a plurality of sub-blocks of the macroblock in response to a set of discrete candidate motion vectors selected from the plurality of first motion vectors. The third circuit may be configured to segment the macroblock in response to (i) the plurality of first motion vectors and first error scores and (ii) the plurality of second motion vectors and second error scores.

The objects, features and advantages of the present invention include providing a method and/or apparatus for segmented motion estimation with no search for small block sizes that may (i) be implemented with smaller, lower speed integrated circuits (ICs), (ii) provide faster software implementations than conventional solutions, (iii) use a set of possible encoding methods instead of performing an actual search, (iv) search only the larger blocks of a macroblock and/or (v) use vectors obtained for larger blocks for the smaller blocks of a macroblock.

BRIEF DESCRIPTION OF THE DRAWINGS

These and other objects, features and advantages of the present invention will be apparent from the following detailed description and the appended claims and drawings in which:

FIG. 3 is a flow diagram of a motion estimation process in accordance with a preferred embodiment of the present invention;

DETAILED DESCRIPTION OF THE PREFERRED EMBODIMENTS

Figure 1:
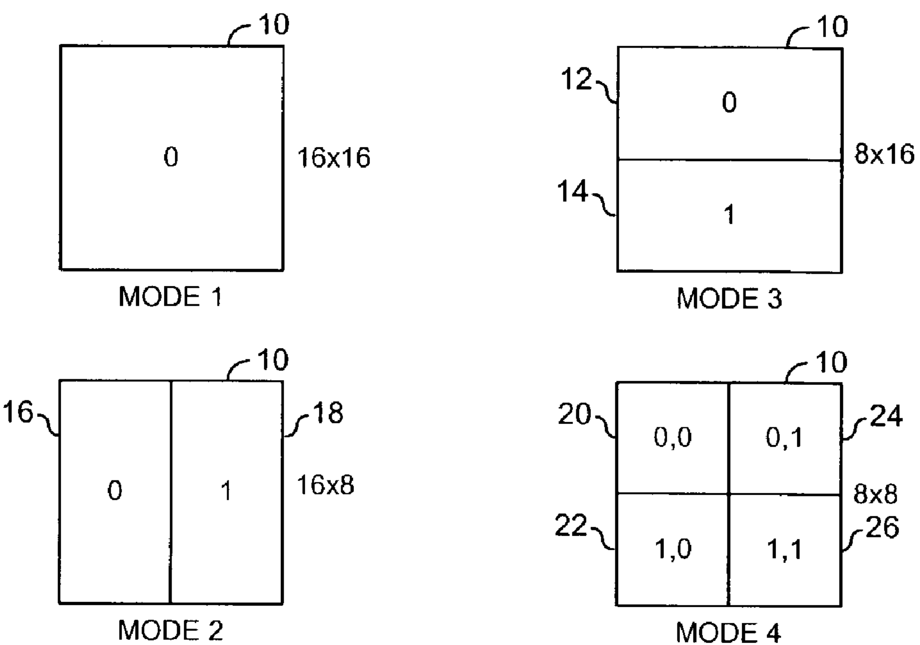
FIG. 1 is a block diagram illustrating various block sizes and shapes supported by H.264 for encoding an example 16×16 macroblock.

Referring to FIG. 1, a block diagram is shown illustrating various block sizes and shapes that may be used to perform motion estimation (ME) on a macroblock 10. The macroblock 10 may be a portion of an H.264 compliant bit-stream. In one example, the macroblock 10 may be implemented as a 16×16 block. Each 16×16 macroblock 10 may be predicted with a single 16×16 vector (e.g., mode 1). Alternatively, the macroblock 100 may be segmented into two 16×8 blocks 12 and 14 (e.g., mode 2) or two 8 ×16 blocks 16 and 18 (e.g., mode 3) in which case two motion vectors may be generated for predicting the macroblock 10. The macroblock 10 may also be segmented into four 8×8 blocks 20-26 (e.g., mode 4) in which case four motion vectors may be generated for the macroblock 100.

Figure 2:
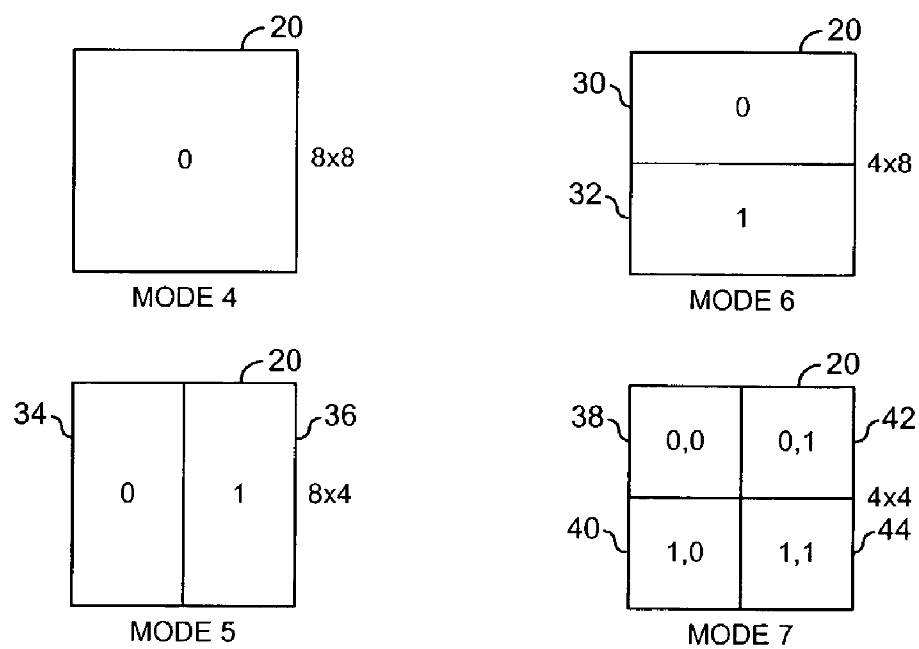
FIG. 2 is a block diagram illustrating various sub-block sizes and shapes supported by H.264 for encoding the example 16×16 macroblock of FIG. 1.

Referring to FIG. 2, a block diagram is shown illustrating a number of small block (or sub-block) sizes and shapes that may be used to perform motion estimation on the macroblock 10. When the macroblock 10 is segmented into the four 8×8 blocks 20-26 (e.g., mode 4), each 8×8 block may be optionally further segmented into two 8×4 sub-blocks 30 and 32, two 4×8 sub-blocks 34 and 36, or four 4×4 sub-blocks 38-44 (e.g., modes 5-7). An encoder generally decides which "mode" to use for encoding each macroblock 10. For example, an error score may be computed based on a closeness of match determination for each mode, with the modes that use more vectors being penalized (e.g., by increasing the respective error score) because of the additional bits that it will take to encode the motion vectors.

The present invention may provide a motion estimation technique for compression/decompression systems that may run faster, allow smaller hardware implementations, reduce power consumption and/or provide better image quality than conventional solutions. In a first stage of the motion estimation process a motion estimation search may be performed on a first subset (e.g., 16×16, 16×8, 8×16, and 8×8 blocks) of the encoding modes supported by the H.264 protocol. The motion estimation on the first subset of modes may be performed, in one example, using convention methods. In a preferred embodiment, the motion estimation may be performed using a hierarchical search followed by application of computational splits (e.g., see co-pending application U.S. Ser. No. 10/324,487, filed Dec. 20, 2002, which is hereby incorporated by reference in its entirety).

Motion estimation may be performed for a second subset of modes (e.g., any remaining modes) by considering only a discrete set of motion vector choices. The discrete set of motion vectors applied to the second subset may, for example, comprise one or more of an 8×8 motion vector for a current block, an 8×8 motion vector for an adjacent block or the 0,0 motion vector.

In general, for the second subset of modes, an actual search is generally not performed. Rather, a discrete set of possible techniques for encoding may be applied. For example, a search may be performed to obtain motion vectors for the 16×16 block, 8×16 blocks, 16×8 blocks, and the 8×8 blocks. A vector for the each of the 4×8 blocks, 8×4 blocks and 4×4 blocks, may be obtained by selecting, in one example, one or more of the following: 1) a vector for a co-located 8×8 block; 2) a zero motion vector; 3) a vector for an adjacent 8×8 block to the right; 4) a vector for an adjacent 8×8 block to the left; 5) a vector for an adjacent 8×8 block above; 6) a vector for an adjacent 8×8 block below; 7) a vector for an adjacent 8×8 block diagonally above and to the left; 8) a vector for an adjacent 8×8 block diagonally above and to the right; 9) a vector for an adjacent 8×8 block diagonally below and to the left; and/or 10) a vector for an adjacent 8×8 block diagonally below and to the right. All ten possibilities are generally not used for each smaller block. For example, referring to FIG. 2, for the upper-left 4×4 block 38 of an 8×8 block 20, options 3, 6, 8, 9 and 10 are not generally used. In another example, for the lower-right 4 ×4 block 44 of the 8×8 block 20, options 4, 5, 7, 8 and 9 are not generally used.

Referring to FIG. 3, a flow diagram of a process 100 is shown illustrating an example process in accordance with a preferred embodiment of the present invention. The process 100 may be illustrated by a number of steps 102, 104, 106, 108, 110, 112 and 114. In the step 102, motion estimation techniques may be applied to a macroblock of an image (e.g., a 16×16 block 10) to select a set of best motion vectors for the 16×16 block, the two 16×8 blocks, the two 8×16 blocks and the four 8×8 blocks. For each block (e.g., the whole 16×16 macroblock, the two 16×8 blocks, the two 8×16 blocks, and the four 8×8 blocks), a range of motion vectors is generally considered. For example, for one block, a center vector (e.g., Y0,X0) may be chosen and all vectors in a range (e.g., Y0±Ky, X0±Kx, where Ky and Kx are constants) may be considered. In one example, a hierarchical search as described in the co-pending application U.S. Ser. No. 10/324,487, filed Dec. 20, 2002 may result in Y0 and X0 being chosen based on decimated searches. Alternatively, a full search may be performed using X0=Y0=0.

For each block, the best motion vector in the considered range is generally chosen. For example, for each vector considered, the vector that gives the smallest sum-of-absolute-differences (SAD) between, for example, a luminance signal to be encoded and the reference pixels may be chosen. In another example, the vector that minimizes a weighted sum between the SAD score and a one-norm of the difference between the motion vector predictor and the motion vector may be chosen. The term one-norm generally refers to a sum of absolute differences between a first block of pixels (e.g., A) that is H rows high and W columns wide, where the pixel in row y and column x is referred to as A(y,x), and a same-sized block of pixels (e.g., B), where the pixel in row y and column x is referred to as B(y,x). The one-norm difference between the block A and the block B is generally expressed by the following equation:

$$\Sigma_{y=1}^{H}\Sigma_{x=1}^{W}|A(y,x)-B(y,x)|,$$

where |Z| denotes the absolute value of Z.

In the step 104, a discrete set of candidate motion vectors for each of the two 8×4 sub-blocks, the two 4×8 sub-blocks and the four 4×4 sub-blocks in each 8×8 block of the macroblock may be determined. In the step 106, a best 8×4 vector may be selected from among the candidate 8×4 vectors from the step 104. In the step 108, a best 4×8 vector may be selected from among the candidate 4×8 vectors from the step 104. In the step 110, a best 4×4 vector may be selected from among the candidate 4×4 vectors from the step 104. In each of the steps 106-110, a set of "discrete motion vectors" for each 8×4, 4×8, or 4×4 sub-block may be considered. For example, the zero motion vector and one nearby motion vector (as described in the example above) may be considered. For each sub-block, the best motion vector in the considered discrete set is generally chosen. Although the steps 106-110 have been described sequentially, the steps 106-110 may be performed simultaneously (e.g., in parallel). As used herein, the term "simultaneously" is meant to describe events that share some common time period but the term is not meant to be limited to events that begin at the same point in time, end at the same point in time, or have the same duration.

After the steps 106-110 have been performed, a single best vector for every sub-block size has generally been selected. In the step 112, a determination of a best mode (e.g., mode 5, mode 6, mode 7 or mode 8) is generally determined for each 8×8 block. For example, a single 8×8 block may be encoded using (i) an 8×8 vector (e.g., mode 4), (ii) two (e.g., left and right) 8×4 vectors (e.g., mode 5), (iii) two (e.g., top and bottom) 4×8 vectors (e.g., mode 6) , or (iv) four 4×4 vectors (e.g., mode 7). In the step 112, the best "mode" (e.g., 5, 6, 7 or 8) for each 8×8 block is generally selected. In the step 114, the selection of the best mode for all (or none) of the 8×8 blocks may be overridden by instead choosing the vectors for the 16×8, 8×16, or 16×16 blocks.

In the steps 106-110, for example, the following best vectors may be determined: the upper-left 8×8 block uses a single 8×8 vector; the upper-right 8×8 block uses two 4×8 vectors; the lower-left 8×8 block uses four 4×4 vectors; the lower-right 8×8 block uses four 4×4 vectors. In the step 114, for example, one of the following actions may be selected:

1) Use the vectors selected for each 8×8 block in the steps 106-110 (e.g., override none);

2) Use the single 16×16 vector (e.g., override all other selections);

3) Use the two 16×8 vectors (e.g., override all other selections); or

4) Use the two 8×16 vectors (e.g., override all other selections). In general, the step 114 determines a best mode from among the various modes available for each macroblock. The segmentation of the macroblock (e.g., what block size(s) to use) may then be determined.

Figure 4:
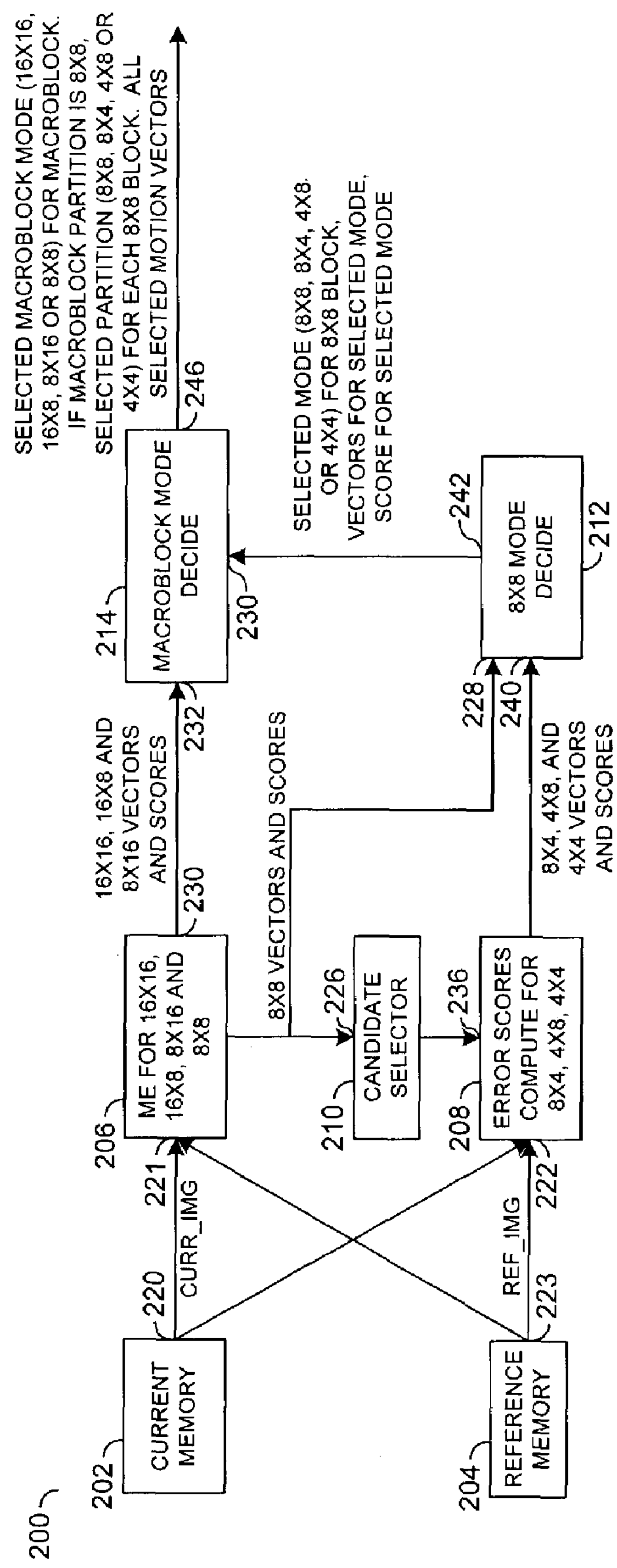
FIG. 4 is a block diagram of a motion estimation apparatus in accordance with a preferred embodiment of the present invention.

Referring to FIG. 4, a block diagram of a circuit 200 is shown illustrating a motion estimation circuit (or block) in accordance with the present invention. The circuit 200 may comprise a circuit 202, a circuit 204, a circuit 206, a circuit 208, a circuit 210, a circuit 212 and a circuit 214. The circuits 202 and 204 may be implemented as memories. The circuits 202 and 204 may be configured to store, in one example, a current image and a reference image.

The circuit 206 may be implemented as a motion estimation circuit. The circuit 206 may be configured to generate a number of motion vectors and error scores for a predetermined number of blocks in a macroblock. In one example, the circuit 206 may be configured to generate vectors and scores for blocks measuring 16 ×16 through 8×8 (e.g., modes 1-4). The circuit 206 may be further configured to determine a best vector for each of the modes. In general, the circuit 206 may be configured to consider a range of motion vectors selected in a way that ensures the vectors considered are spatially adjacent.

The circuit 208 may be implemented as a computation block. The circuit 208 may be configured to determine error scores for a number of sub-blocks of the macroblock. In one example, the circuit 208 may be configured to determine the error scores for the sub-blocks measuring 8×4 through 4×4 (e.g., modes 5-7) in response to information received from the circuits 202 and 204 and candidate vectors received from the circuit 210. The circuit 208 may be further configured to determine a best vector for each of the sub-blocks.

The circuit 210 may be implemented as a candidate selector block. The circuit 210 may be configured to select a set of discrete motion vectors from the vectors determined by the circuit 206. In one example, the circuit 210 may be configured to select the set of discrete motion vectors from the vectors for the 8×8 blocks of the macroblock. The circuit 210 may be configured to select the vectors according to one or more predetermined rules. In general, the circuit 210 selects candidate vectors without regard for whether the candidate vectors are spatially adjacent to one another.

The circuit 212 may be implemented as a mode decision block. The circuit 212 may be configured to determine a best mode (e.g., 8×8, 8×4, 4×8, 4×4) for each 8×8 block in response to the 8×8 vectors and scores received from the circuit 206 and the 8×4, 4×8 and 4×4 vectors and scores received from the circuit 208. The circuit 212 generally presents the best vector and scores for the selected mode to the circuit 214.

The circuit 214 may be implemented as a macroblock mode decision block. The circuit 214 may be configured to select the segmentation mode for the macroblock in response to the vectors and error scores received from the circuits 206 and 212. The circuit 214 generally presents the selected motion vectors and mode for the macroblock.

The circuit 202 may have an output 220 that may present a signal (e.g., CURR_IMG) to an input 221 of the block 206 and an input 222 of the block 208. The circuit 204 may have an output 223 that may present a signal (e.g., REF_IMG) to the inputs 221 and 222 of the blocks 206 and 208, respectively. The signal CURR_IMG may comprise information from a current image. The signal REF_IMG may comprise information from a reference image. The circuit 206 may have (i) an output 224 that may present a signal to an input 226 of the block 210 and an input 228 of the block 212 and (ii) an output 230 that may present a signal to an input 232 of the block 214. The circuit 210 may have an output 234 that may present a signal to an input 236 of the block 208. The block 208 may have an output 238 that may present a signal to an input 240 of the block 212. The block 212 may have an output 242 that may present a signal to an input 244 of the block 214. The block 214 may have an output 246 that may present information for a selected macroblock mode.

Performing motion estimation for all block sizes is generally expensive. For example, when an encoder is embodied in software running on a general-purpose processor, the processor generally needs to run faster to search all modes in a given amount of time than to search a sub-set of the modes in the same amount of time. When an encoder is embodied as an application specific integrated circuit (ASIC), an application specific standard product (ASSP), a field programmable gate array (FPGA) chip, etc., the chip will generally need to run faster or be larger to support all modes.

The present invention generally performs motion estimation on a number of modes in a first subset (e.g., 16×16, 16×8, 8×16 and 8×8) using a range of motion vectors while considering only a discrete set of motion vectors for a number of modes in a second subset (e.g., any remaining modes). Conventional methods may be used for the modes in the first subset where motion estimation is performed. In one example, a hierarchical search followed by computational splits may be used for motion estimation (e.g., see co-pending application U.S. Ser. No. 10/324,487, filed Dec. 20, 2002, which is hereby incorporated by reference in its entirety). The discrete set of motion vectors used for the second subset may, in one example, include (i) one or more 8×8 motion vectors for the 8×8 block that includes the current block, (ii) one or more 8×8 motion vectors from an adjacent 8×8 block or (ii) the zero motion vector. However, other vector choices may be implemented accordingly to meet the design criteria of a particular implementation. For each of the vector choices, an error score may be computed.

The different vectors may be penalized (e.g., have the error score adjusted) for the additional bits that are used to encode the motion vectors. In one example, a number may be added to the error score for each mode that is proportional to the number of vectors used by the mode. In another example, a number may be added to the error score for each mode that is proportional to the number of bits that would be used to encode the motion vectors for that mode. Of the vectors considered, the vector with the lowest penalized score is generally chosen for the particular block. Conventional methods may be used to decide which mode (or block size) to use for the macroblock (or 8 ×8 section of the macroblock).

Because the small blocks (e.g., the 8×4, 4×8, and 4 ×4 blocks) may each have more than one adjacent block, a set of rules is generally implemented to decide which adjacent 8×8 block to use as a candidate vector. An example set of rules may be summarized as in the following TABLE 1:

TABLE 1

| Rule | Current Block | Adjacent Block |
|---|---|---|
| 1 | For the 8 × 4 block on the left side of the 8 × 8 block | the 8 × 8 block to the left |
| 2 | For the 8 × 4 block on the right side of the 8 × 8 block | the 8 × 8 block to the right |
| 3 | For the 4 × 8 block on the top half of the 8 × 8 block | the 8 × 8 block on top |
| 4 | For the 4 × 8 block on the bottom half of the 8 × 8 block | the 8 × 8 block on bottom |
| 5 | For the 4 × 4 block in the upper-left corner of the 8 × 8 block | the 8 × 8 block above and to the left |
| 6 | For the 4 × 4 block in the lower-left corner of the 8 × 8 block | the 8 × 8 block below and to the left |

TABLE 1-continued

| Rule | Current Block | Adjacent Block |
|---|---|---|
| 7 | For the 4 × 4 block in the upper-right corner of the 8 × 8 block | the 8 × 8 block above and to the right |
| 8 | For the 4 × 4 block in the lower-right corner of the 8 × 8 block | the 8 × 8 block below and to the right |

Figure 5A:
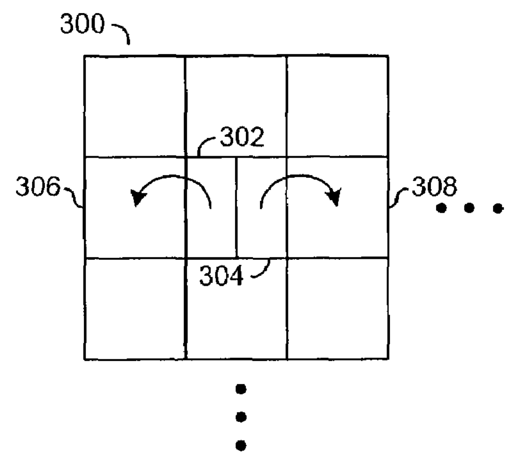
FIG. 5*a* is a block diagram illustrating an example set of rules for applying motion vectors of adjacent 8×8 blocks to 8×4 blocks.
Figure 5B:
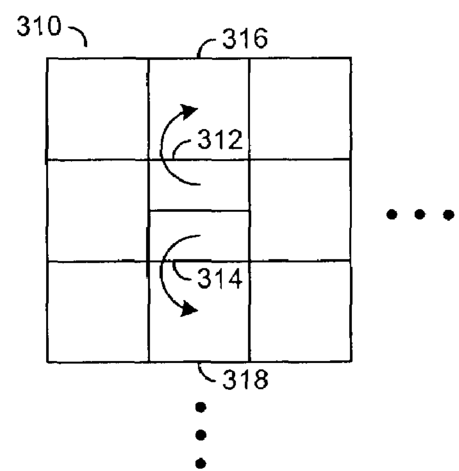
FIG. 5*b* is a block diagram illustrating an example of a set of rules for applying motion vectors of adjacent 8×8 blocks to 4×8 blocks.
Figure 5C:
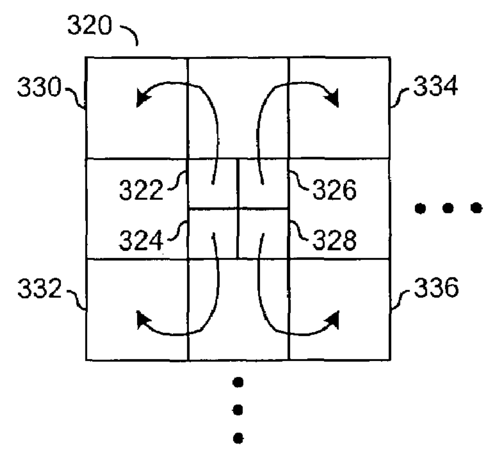
FIG. 5*c* is a block diagram illustrating an example set of rules for application of motion vectors from adjacent 8×8 blocks to 4×4 blocks.

Referring to FIGS. 5(*a-c*), block diagrams are shown illustrating example rules for 8×4 blocks (FIG. 5*a*), 4×8 blocks (FIG. 5*b*) and (iii) 4×4 blocks (FIG. 5*c*). Referring to FIG. 5*a*, a section 300 of an image is shown illustrating a number of 8×8 blocks. In one example, two sub-blocks 302 and 304 (e.g., 8×4 blocks) of an 8×8 block may use a vector from an adjacent 8×8 block (e.g., as indicated by the curved arrows) . For example, for the 8×4 block 302, a vector from the 8×8 block 306 may be used as a candidate vector. For the 8×4 block 304, a vector from the 8×8 block 308 may be used as a candidate vector (e.g., see Rules 1 and 2 in TABLE 1 above).

Referring to FIG. 5*b*, a section of an image 310 divided into a number of 8×8 blocks is shown. In one example, two sub-blocks 312 and 314 (e.g., 4×8 blocks) of an 8×8 block may use a vector from an adjacent 8×8 block (e.g., as indicated by the curved arrows). For example, a 4×8 block 312 on the top half of the 8×8 block may look to the 8×8 block 316 above for a candidate vector while the 4×8 block 314 may look to the 8×8 block 318 below for a candidate vector (see Rules 3 and 4 of TABLE 1 above).

Referring to FIG. 5*c*, a portion of an image 320 containing a number of 8×8 blocks is shown. In one example, an 8×8 block of the image 320 may be sub-divided into four 4×4 sub-blocks 322, 324, 326 and 328. The 4×4 sub-blocks may use motion vectors from adjacent 8×8 blocks as indicated by the curved arrows. Applying Rules 5-8 of TABLE 1 above, the 4×4 block 322 may use a motion vector of an 8×8 block 330 as a candidate vector. The 4×4 block 324 may use a motion vector of the 8×8 block 332 as a candidate vector. The 4×4 block 326 may use a motion vector of the 8×8 block 324 as a candidate vector. The 4×4 block 328 may use a motion vector of the 8×8 block 336 as a candidate vector.

The present invention may use the following process. For the first subset of blocks (e.g., the whole 16×16 macroblock, the two 16×8 blocks, the two 8×16 blocks, the four 8×8 blocks), a range of motion vectors is generally considered. For example, a center vector (YO,X0) may be chosen and all vectors in the range (Y0+/−Ky, X0+/−Kx), where Ky and Kx are constants, considered. For a hierarchical search, Y0 and XO may be chosen based on decimated searches. For a full search, X0=Y0=0 may be used. A best vector and associated error score may be determined for each block in the first subset of blocks. Candidate vectors may be selected from the vectors determined for the first subset of blocks. The selected vectors may be used to determine the best mode or modes for a second subset of blocks (e.g., the 8×4, 4×8, and 4×4 sub-blocks) without performing a search for the blocks of the second subset.

As used herein the term "best" generally refers to the vector or vectors that generally give the best tradeoff between the number of bits used to encode the macroblock and the perceived quality of the macroblock when reconstructed by the decoder, subject to the constraint that the encoder uses only a limited amount of resources to select the vector. In one example, for each vector considered, the encoder may be configured to select the vector that gives the smallest sum-of-absolute-differences (SAD) between, for example, a luminance signal to be encoded and the reference pixels. In another example, the vector that minimizes a weighted sum between the SAD score and a one-norm of the difference between the motion vector predictor and the motion vector may be chosen.

As used herein, a range generally refers to 2 or more motion vectors selected in a way that ensures the motion vectors are spatially adjacent. A set of discrete motion vectors generally refers to 1 or more motion vectors selected in a way that does not ensure the vectors are spatially adjacent. For example, the 0,0 vector and the vector from the 8×8 block to the left may be chosen. Although the two vectors may be adjacent (e.g., the left vector is 1,0), the vectors are generally not considered selected in a way that ensures that the vectors are spatially adjacent.

The function performed by the flow diagram of FIG. 3 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, ASSPs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:

a first circuit configured to generate a plurality of first motion vectors and first error scores in response to a search of each n×n macroblock of an image, wherein said plurality of first motion vectors comprises motion vectors for (i) each n×n macroblock of said image, (ii) two n×n/2 blocks of each n×n macroblock of said image, (iii) two n/2×n blocks of each n×n macroblock of said image and (iv) four n/2×n/2 blocks of each n×n macroblock of said image;

a second circuit configured to select a plurality of second motion vectors and generate a plurality of second error scores for a plurality of sub-blocks of each n/2×n/2 block of each n×n macroblock of said image in response to a set of discrete candidate motion vectors selected for each n/2×n/2 block from said plurality of first motion vectors, wherein (i) said plurality of sub-blocks comprises two n/2×n/4 sub-blocks, two n/4×n/2 sub-blocks and four n/4×n/4 sub-blocks, and (ii) said set of discrete candidate motion vectors comprises motion vectors for nine n/2×n/2 blocks adjacent to the n/2×n/2 block containing said plurality of sub-blocks and (iii) one of said discrete candidate motion vectors is selected for each sub-block of said plurality of sub-blocks without performing a search for each sub-block of said plurality of sub-blocks; and a third circuit configured to segment each n×n macroblock in response to (i) said plurality of first motion vectors and first error scores and (ii) said plurality of second motion vectors and second error scores.

2. The apparatus according to claim 1, wherein said first circuit is configured to generate a range of motion vectors in a way that ensures the motion vectors are spatially adjacent.

3. The apparatus according to claim 1, wherein said second circuit is configured to select said candidate motion vectors without regard to whether said candidate motion vectors are spatially adjacent.

4. The apparatus according to claim 1, wherein said second circuit comprises a fourth circuit configured to select said candidate motion vectors in response to one or more predetermined rules.

5. The apparatus according to claim 4, wherein said second circuit further comprises a fifth circuit configured to generate said plurality of second error scores in response to said set of discrete candidate motion vectors and said image.

6. The apparatus according to claim 1, wherein said second circuit is further configured to determine one or more best motion vectors for said plurality of sub-blocks of said each n/2×n/2 block of each n×n macroblock.

7. The apparatus according to claim 6 wherein said first circuit is configured to determine a best mode for a plurality of blocks of each n×n macroblock.

8. The apparatus according to claim 1, wherein said set of discrete candidate motion vectors comprises one or more of (i) a vector for a co-located 8×8 block, (ii) a zero motion vector, (iii) a vector for an adjacent 8×8 block to the right, (iv) a vector for an adjacent 8×8 block to the left, (v) a vector for an adjacent 8×8 block above, (vi) a vector for an adjacent 8×8 block below, (vii) a vector for an adjacent 8×8 block diagonally above and to the left, (viii) a vector for an adjacent 8×8 block diagonally above and to the right, (ix) a vector for an adjacent 8×8 block diagonally below and to the left and (x) a vector for an adjacent 8×8 block diagonally below and to the right.

9. The apparatus according to claim 1, wherein said first error scores and said second error scores are adjusted by adding a number to each of said first error scores and said second error scores that is proportional to a number of vectors used by a corresponding mode.

10. The apparatus according to claim 1, wherein said first error scores and said second error scores are adjusted by adding a number to each of said first error scores and said second error scores that is proportional to a number of bits used to encode motion vectors for a corresponding mode.

11. The apparatus according to claim 1, wherein, said plurality of sub-blocks comprises sub-blocks of a current one of said n/2×n/2 blocks; and the one of said discrete candidate motion vectors selected for each respective sub-block of said plurality of sub-blocks is selected such that (i) for an n/2×n/4 block on a left side of the current n/2×n/2 block the vector selected is from an n/2×n/2 block to the left, (ii) for an n/2×n/4 block on a right side of the current n/2×n/2 block the vector selected is from an n/2×n/2 block to the right, (iii) for an n/4×n/2 block on a top half of the current n/2×n/2 block the vector selected is from an n/2×n/2 block on top, (iv) for an n/4×n/2 block on a bottom half of the current n/2×n/2 block the vector selected is from an n/2×n/2 block on the bottom, (v) for an n/4×n/4 block in an upper-left corner of the current n/2×n/2 block the vector selected is from an n/2×n/2 block above and to the left, (vi) for an n/4×n/4 block in a lower-left corner of the current n/2×n/2 block the vector selected is from an n/2×n/2 block below and to the left, (vii) for an n/4×n/4 block in an upper-right corner of the current n/2×n/2 block the vector selected is from an n/2×n/2 block above and to the right and (viii) for an n/4×n/4 block in a lower-right corner of the current n/2×n/2 block the vector selected is from an n/2×n/2 block below and to the right.

12. An apparatus comprising:

means for generating a plurality of first motion vectors and first error scores in response to a search of each n×n macroblock of an image, wherein said plurality of first motion vectors comprises motion vectors for (i) each n×n macroblock of said image, (ii) two n×n/2 blocks of each n×n macroblock of said image, (iii) two n/2×n blocks of each n×n macroblock of said image and (iv) four n/2×n/2 blocks of each n×n macroblock;

means for selecting a plurality of second motion vectors and generating a plurality of second error scores for a plurality of sub-blocks of each n/2×n/2 block of each n×n macroblock of said image in response to a set of discrete candidate motion vectors selected for each n/2×n/2 block from said plurality of first motion vectors, wherein (i) said plurality of sub-blocks comprises two n/2×n/4 sub-blocks, two n/4×n/2 sub-blocks and four n/4×n/4 sub-blocks, (ii) said set of discrete candidate motion vectors comprises motion vectors for nine n/2×n/2 blocks adjacent to the n/2×n/2 block containing said plurality of sub-blocks and (iii) one of said discrete candidate motion vectors is selected for each sub-block of said plurality of sub-blocks without performing a search for each sub-block of said plurality of sub-blocks; and means for segmenting each n×n macroblock in response to (i) said plurality of first motion vectors and first error scores and (ii) said plurality of second motion vectors and second error scores.

13. A method for segmented motion estimation comprising:

(A) generating a plurality of first motion vectors and first error scores in response to a search of each n×n macroblock of an image, wherein said plurality of first motion vectors comprises motion vectors for (i) each n×n macroblock of said image, (ii) two n×n/2 blocks of each n×n macroblock of said image, (iii) two n/2×n blocks of each n×n macroblock of said image and (iv) four n/2×n/2 blocks of each n×n macroblock;

(B) selecting a plurality of second motion vectors and generating a plurality of second error scores for a plurality of sub-blocks of each n/2×n/2 block of each n×n macroblock of said image in response to a set of discrete candidate motion vectors selected from said plurality of first motion vectors, wherein (i) said plurality of sub-blocks comprises two n/2×n/4 sub-blocks, two n/4×n/2 sub-blocks and four n/4×n/4 sub-blocks, (ii) said set of discrete candidate motion vectors comprises motion vectors for nine n/2×n/2 blocks adjacent to the n/2×n/2 block containing said plurality of sub-blocks and (iii) one of said discrete candidate motion vectors is selected for each sub-block of said plurality of sub-blocks without performing a search for each sub-block of said plurality of sub-blocks; and (C) segmenting each n ×n macroblock in response to (i) said plurality of first motion vectors and first error scores and (ii) said plurality of second motion vectors and second error scores.

14. The method according to claim 13, wherein the step (A) further comprises:

generating a range of motion vectors in a way that ensures the motion vectors are spatially adjacent.

15. The method according to claim 14, wherein the step (B) further comprises:

selecting said set of discrete candidate motion vectors from said plurality of first motion vectors without regard to whether said candidate motion vectors are spatially adjacent.

16. The method according to claim 13, wherein the step (A) further comprises:

determining one or more best motion vectors for each n×n macroblock, the two n×n/2 blocks of each n×n macroblock, the two n/2×n blocks of each n×n macroblock and the four n/2×n/2 blocks of each n×n macroblock, where n is an integer.

17. The method according to claim 16, wherein the step (B) further comprises:

determining said set of discrete candidate motion vectors for each of said n/2×n/2 blocks.

18. The method according to claim 17, further comprising: determining one or more best n/2×n/4 vectors from said candidate motion vectors.

19. The method according to claim 17, further comprising: determining one or more best n/4×n/2 vectors from said candidate motion vectors.

20. The method according to claim 17, further comprising: determining one or more best n/4×n/4 vectors from said candidate motion vectors.

21. The method according to claim 17, further comprising: determining a best mode for each of said n/2×n/2 blocks.

22. The method according to claim 17, further comprising determining a best mode for said macroblock.

23. The method according to claim 13, wherein said set of discrete candidate motion vectors comprises one or more of (i) a vector for a co-located 8×8 block, (ii) a zero motion vector, (iii) a vector for an adjacent 8×8 block to the right, (iv) a vector for an adjacent 8×8 block to the left, (v) a vector for an adjacent 8×8 block above, (vi) a vector for an adjacent 8×8 block below, (vii) a vector for an adjacent 8×8 block diagonally above and to the left, (viii) a vector for an adjacent 8×8 block diagonally above and to the right, (ix) a vector for an adjacent 8×8 block diagonally below and to the left and (×) a vector for an adjacent 8×8 block diagonally below and to the right.

24. The method according to claim 13, wherein said plurality of second motion vectors and second error scores for said plurality of sub-blocks are generated without performing a search for said sub-blocks.

25. The method according to claim 13, wherein:

said plurality of sub-blocks comprises sub-blocks of a current one of said n/2×n/2 blocks; and the one of said discrete candidate motion vectors selected for each respective sub-block of said plurality of sub-blocks is selected such that (i) for an n/2×n/4 block on a left side of the current n/2×n/2 block the vector selected is from an n/2×n/2 block to the left, (ii) for an n/2×n/4 block on a right side of the current n/2×n/2 block the vector selected is from an n/2×n/2 block to the right, (iii) for an n/4×n/2 block on a top half of the current n/2×n/2 block the vector selected is from an n/2×n/2 block on top, (iv) for an n/4×n/2 block on a bottom half of the current n/2×n/2 block the vector selected is from an n/2×n/2block on the bottom, (v) for an n/4×n/4 block in an upper-left corner of the current n/2×n/2 block the vector selected is from an n/2×n/2 block above and to the left, (vi) for an n/4×n/4 block in a lower-left corner of the current n/2×n/2 block the vector selected is from an n/2×n/2 block below and to the left, (vii) for an n/4×n/4 block in an upper-right corner of the current n/2×n/2 block the vector selected is from an n/2×n/2 block above and to the right and (viii) for an n/4×n/4 block in a lower-right corner of the current n/2×n/2 block the vector selected is from an n/2×n/2 block below and to the right.

* * * * *